H. C. BROWN.
WASHERLESS FAUCET.
APPLICATION FILED MAR. 5, 1913.
1,071,504.
Patented Aug. 26, 1913.
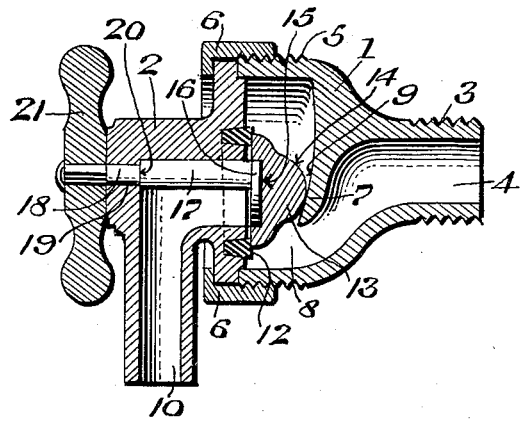
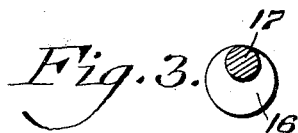
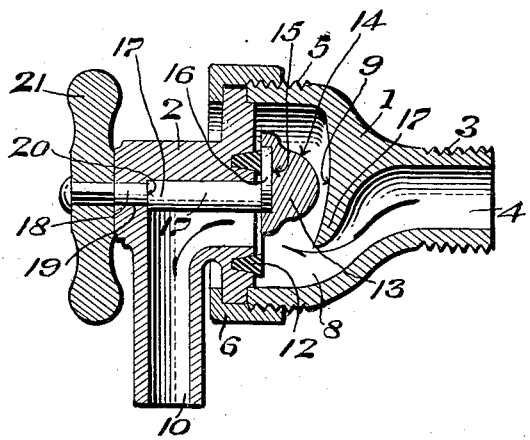
WITNESSES
P. F. Nagle.
H. G. Dieterich
INVENTOR
Henry C. Brown,
BY
ATTORNEYS

UNITED STATES PATENT OFFICE.

HENRY C. BROWN, OF BROOKLYN, NEW YORK, ASSIGNOR OF ONE-HALF TO HENRY STOCKMAN, OF ENGLEWOOD, NEW JERSEY.

WASHERLESS FAUCET.

1,071,504.       Specification of Letters Patent.       Patented Aug. 26, 1913.

Original application filed July 24, 1912, Serial No. 711,197. Divided and this application filed March 5, 1913. Serial No. 752,016.

*To all whom it may concern:*

Be it known that I, HENRY C. BROWN, a citizen of the United States, residing in the borough of Brooklyn, county of Kings, State of New York, have invented a new and useful Washerless Faucet, of which the following is a specification.

This invention relates to a novel construction of a faucet or valve and embodies subject-matter originally disclosed and claimed in my pending application Serial No. 711,197, of which the present application forms a division.

It has for an object to provide a valve in which no packing or washers are necessary or employed to prevent leakage and which maintains a fluid tight seal with its seat.

It is a further object of my invention to not only provide a valve which is leak proof but is positively locked in its closed position and as an auxiliary to this locking means I rely upon the pressure of the fluid to further insure the valve being retained in fixed position on its seat.

My invention further consists of a novel construction whereby the action of the valve is such as to prevent particles of dirt from holding the valve partly open or causing the valve to be scored, whereby it becomes unfit for service or requires grinding.

It further consists of other novel features of construction all as will be hereinafter fully set forth.

For the purpose of illustrating my invention, I have shown in the accompanying drawing, one form thereof which is at present preferred by me, although it is to be understood that the various instrumentalities of which my invention consists can be variously arranged and organized and that my invention is not limited to the precise arrangement and organization of these instrumentalities as herein shown and described.

Figure 1 represents a sectional elevation of a faucet embodying my invention, the valve being shown in closed position. Fig. 2 represents a sectional elevation similar to Fig. 1 showing the valve and its adjuncts in open position. Fig. 3 represents a section of the valve stem.

Similar numerals of reference indicate corresponding parts in the figures.

Referring to the drawings, the valve body or casing is formed in the present instance of two body portions or parts designated by the reference numerals 1 and 2, the former of which is provided with a threaded extension 3 for the purpose of connecting the faucet with any desired source of fluid supply, which as here shown enters the casing 1 through the inlet 4. The opposite end of the casing 1 is provided with a threaded portion 5 adapted for engagement with a threaded cap member 6 which performs the function of a union head and maintains the parts in fluid tight engagement with each other.

The casing member 1 in the present instance is provided with a wall or abutment 7 which extends into the enlarged chamber 8 of the casing said abutment having its inner face 9 curved or inclined in the nature of a cam the purpose of which will later appear. The outlet 10 of the faucet is formed in the member 2 and communicates with a passage 11 leading to the chamber 8.

12 designates an annular member forming a valve seat which encircles the passage 11 and is suitably secured in the face of the casing member 2 as will be apparent. This member 12 in the present instance has a driving fit with the part 2 and it may therefore be readily removed and replaced should occasion demand.

13 designates the valve which in the present instance is formed with a projecting cam face 14 which is adapted to contact at certain times with the face 9 of the part 1. The inner face of the valve 13 seats upon the member 12 and is preferably recessed as shown at 15 in order to receive the head or plate 16 which is eccentrically connected with or forms a part of the valve spindle 17 and it will be noted that this latter is provided with a reduced neck 18 which passes through an opening 19 in the casing member 2, thus forming a shoulder 20 which prevents the spindle 17 from becoming displaced when operated by the hand wheel or lever 21.

The valve 13 as here shown is loosely mounted on the head 16 in order to freely rotate and also allow sufficient clearance so that the pressure of the fluid exerted against the rear portion of the valve will maintain the same properly seated and prevent leakage. Furthermore, this pressure also maintains the valve in place upon the head 16 so that when the hand wheel 21 is turned the valve 13 will move from the position seen in Fig. 1 into the position shown in Fig. 2 or the open position. When the hand wheel is turned to close the valve, the cam face 14 will bear against and ride upon the inclined face 9 so that a wedging action will take place which will firmly hold the valve 13 to its seat 12.

An additional advantage in this action will be seen when it is understood that the valve 13 in moving toward its seat has a rotary motion which tends to bring the contact faces of the valve and the seat into exact conformity with each other and this action causes any particles of dirt or foreign matter in the liquid to either be pushed aside or ground into such a minute condition that it is practically impossible for the valve to become clogged or scored by the presence of such foreign particles.

Special attention is directed to the fact that in my present invention I have entirely eliminated the necessity of employing a packing or gasket in order to maintain a fluid tight seal between the valve and its seat, and I am thereby enabled to entirely eliminate the necessity of continuously repacking the valve at frequent intervals, such as is necessary when the ordinary types of faucets are employed.

It will be apparent that in my present invention, I have reduced to a minimum the number of parts of the device, and since the same may be formed of castings it will be apparent that devices, in accordance with my invention, may be very economically manufactured.

It will now be apparent that I have devised a novel and useful construction of a washerless faucet which embodies the features of advantage enumerated as desirable in the statement of the invention and the above description, and while I have, in the present instance, shown and described preferred embodiments thereof which have been found in practice to give satisfactory and reliable results, it is to be understood that the same are susceptible of modification in various particulars without departing from the spirit or scope of the invention as stted in the claims or sacrificing any of its advantages.

Having thus described my invention, what I claim as new and desire to secure by Letters Patent is:—

1. In a valve, a casing having an inlet and an outlet, a spindle rotatably mounted in said casing and pressing through said outlet, a valve seat in said casing encircling said outlet and said spindle, an eccentric fixed to said spindle between said valve seat and said inlet, a valve movably mounted on said eccentric, said valve having a cam face formed thereon, an abutment carried by said casing between said inlet and said valve seat, said abutment having a cam face thereon located in the path of movement of said valve cam face, and means for rotating said spindle to shift said valve into and out of engagement with said abutment whereby said outlet is opened and closed, said valve engaging said abutment in closed position.

2. In a valve, a casing having an inlet and an outlet, a spindle rotatably mounted in said casing and passing through said outlet, a valve seat removably mounted in said casing and encircling said outlet and said spindle, an eccentric fixed to said spindle, a valve having a recess therein adapted to receive said eccentric and provided with a cam face, said valve being movably mounted on said eccentric, an abutment formed on said casing between said inlet and said valve seat, said abutment having a cam face in the path of movement of said valve cam face, and means to operate said spindle to move said valve from one position to another, said valve in closed position contacting with said abutment whereby the said valve is maintained in closed position.

HENRY C. BROWN.

Witnesses:
BRUNO BLEUL,
ANNIE SCHUE.

---

Copies of this patent may be obtained for five cents each, by addressing the "Commissioner of Patents, Washington, D. C."